United States Patent
Kojima

(10) Patent No.: US 8,006,508 B2
(45) Date of Patent: Aug. 30, 2011

(54) AIR CONDITIONER FOR VEHICLES

(75) Inventor: Toshihiko Kojima, Nisshin (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 953 days.

(21) Appl. No.: 11/918,725

(22) PCT Filed: Apr. 20, 2006

(86) PCT No.: PCT/JP2006/308789
§ 371 (c)(1),
(2), (4) Date: Oct. 18, 2007

(87) PCT Pub. No.: WO2006/112548
PCT Pub. Date: Oct. 26, 2006

(65) Prior Publication Data
US 2009/0064695 A1  Mar. 12, 2009

(30) Foreign Application Priority Data
Apr. 20, 2005  (JP) .................. 2005-122153

(51) Int. Cl.
*B60H 1/32* (2006.01)
*F25B 27/00* (2006.01)
*B60W 10/30* (2006.01)
(52) U.S. Cl. ............ 62/239; 62/236; 62/244; 180/65.27
(58) Field of Classification Search .............. 62/230, 62/236, 239, 244; 903/930; 180/65.265, 180/65.27, 65.275
See application file for complete search history.

(56) References Cited

U.S. PATENT DOCUMENTS

| | | | | |
|---|---|---|---|---|
| 5,555,737 A | * | 9/1996 | Takeo et al. | 62/244 |
| 5,595,064 A | * | 1/1997 | Ikeda et al. | 62/126 |
| 6,073,456 A | * | 6/2000 | Kawai et al. | 62/133 |
| 6,515,448 B2 | | 2/2003 | Iritani et al. | |
| 2004/0168454 A1 | | 9/2004 | Iritani | |
| 2004/0194479 A1 | | 10/2004 | Umebayashi | |

FOREIGN PATENT DOCUMENTS
DE  44 14 547  11/1995

(Continued)

OTHER PUBLICATIONS
International Search Report.

(Continued)

*Primary Examiner* — Frantz F Jules
*Assistant Examiner* — Daniel C Comings
(74) *Attorney, Agent, or Firm* — Finnegan, Henderson, Farabow, Garrett & Dunner, LLP

(57) ABSTRACT

An air conditioner for vehicles in which the probability of executing pre-air conditioning is increased so that it may be prevented that the inside of the vehicle cannot be often in a comfortable state before the driver gets into the vehicle. The air conditioner performs air conditioning of a vehicle having a traveling motor and an engine as drive sources and comprises a pre-air conditioning main switch. The crew permits operation of pre-air conditioning by turning the switch on. When the pre-air conditioning main switch is set on, an engine control section performs charge preference control where battery charge takes precedence of engine fuel consumption and performs normal control where engine fuel consumption takes precedence when the pre-air conditioning main switch is set off.

3 Claims, 11 Drawing Sheets

FOREIGN PATENT DOCUMENTS

| | | |
|---|---|---|
| DE | 10 2004 004 302 | 8/2004 |
| JP | 07-212902 | 8/1995 |
| JP | 9-76740 | 3/1997 |
| JP | 11-139155 | 5/1999 |
| JP | 2002-219926 | 8/2002 |
| JP | 2002-262401 | 9/2002 |
| JP | 2003-331929 | 11/2003 |
| JP | 2004-230936 | 8/2004 |

OTHER PUBLICATIONS

Written Opinion.
Korean Office Action dated Nov. 12, 2008.
Extended European Search Report dated Dec. 30, 2008.
Decision to Grant Patent from the Korean Patent Office for KR 7026974, dated Nov. 25, 2009.

* cited by examiner

AIR CONDITIONER FOR VEHICLES

TECHNICAL FIELD

The present invention relates to an air conditioner for vehicles, and more particularly relates to an air conditioner for vehicles which performs pre-air conditioning before a vehicle occupant boards the vehicle.

BACKGROUND ART

For an air conditioner which air-conditions the inside of a hybrid vehicle that uses an engine and an electric motor as a driving source, a technology that improves comfort by pre-air conditioning the inside of the vehicle during engine stop before a vehicle occupant boards the vehicle has been proposed. This type of the conditioner for vehicles air-conditions the inside of the vehicle by, for instance, driving a compressor by electric power from a battery. Therefore, a control is required to prevent excess battery discharge.

Accordingly, JP-A No. 2004-230936 proposes an air conditioner for vehicles that prohibits pre-air conditioning when battery voltage is lower than a predetermined value during engine stop even if it is anticipated that a vehicle occupant is going to board the vehicle within a predetermined time. As a result, excess discharge of the battery can be inhibited.

Furthermore, an air conditioner according to JP-A No. 2002-219926 includes a fuel cell and performs pre-air conditioning using electric power from the fuel cell. The air conditioner prohibits execution of pre-air conditioning when the remaining capacity of the fuel cell is low.

However, in some cases, with the technologies disclosed in the JP-A No. 2004-230936 and JP-A No. 2002-219926, the vehicle occupant may not be able to operate the pre-air conditioning even if they want to. Therefore, the probability that pre-conditioning will be executed is reduced, thereby causing the problem that there are an increased number of cases when the inside of the vehicle cannot be maintained in a comfortable state.

The present invention has been devised in consideration of the aforementioned circumstances, and it is an object of the invention to provide an air conditioner that increases the probability that pre-air conditioning will be executed and that inhibits an increased occurrence of a situation in which the inside of a vehicle is not in a comfortable state before a vehicle occupant boards the vehicle.

DISCLOSURE OF THE INVENTION

To achieve the aforementioned object, an invention according to claim 1 is characterized by an air conditioner for vehicles that air-conditions an inside of a vehicle and that uses at least an engine as a driving source, including: adjusting means for adjusting at least one of a temperature and an air volume of air discharged from an air outlet provided inside the vehicle using power supplied from electric storage means charged by driving the engine; driving source control means for selecting and executing either one of a charge priority control that controls the engine to prioritize charging of the electric storage means over improvement of fuel efficiency of the engine, and a normal control that controls the engine to prioritize the improvement of the fuel efficiency of the engine; and air conditioning control means for executing a pre-air conditioning control on the adjusting means using the power supplied from the electric storage means when execution of the pre-air conditioning, which air-conditions the inside of the vehicle before a vehicle occupant boards the vehicle, is instructed.

The air conditioner for vehicles of the invention executes air conditioning of the interior of the vehicle which uses at least an engine as a driving source.

The adjusting means adjusts at least one of the temperature and the volume of air discharged from the air outlet provided inside the vehicle, and is operated using power supplied from the electric storage means.

The driving source control means selects and executes either one of the charge priority control for controlling the engine to prioritize charging of the electric storage means over improvement of a fuel efficiency of the engine, and the normal control for controlling the engine to prioritize the improvement of the fuel efficiency of the engine. For example, in case of a hybrid vehicle that uses an engine and an electric motor as a driving source, the percentage of engine driving is increased in the charge priority control as compared to the normal control. Accordingly, the electric storage means can be charged sufficiently.

The air conditioning control means executes a pre-air conditioning control on the adjusting means using the power supplied from the electric storage means when execution of the pre-air conditioning, which air-conditions the inside of the vehicle before a vehicle occupant boards the vehicle, is instructed.

As described above, since it is possible to select between execution of the charge priority control and the normal control, the probability of executing the pre-air conditioning can be increased as compared to when the normal control is constantly executed.

The air conditioner for vehicles according to the first aspect of the present invention further includes setting means for setting whether or not to allow operation of the pre-air conditioning. Furthermore, the driving source control means executes the charge priority control when operation of the pre-air conditioning is allowed by the setting means, and executes the normal control when operation of the pre-air conditioning is prohibited by the setting means.

In this case, the charge priority control is inevitably executed when permission to operate the pre-air conditioning is set by the vehicle occupant, thereby enabling constant execution of the pre-air conditioning.

Moreover, an air conditioner for vehicles according to a second aspect of th e present invention, in replacement of the setting means, includes calculating means for calculating an operation frequency of the pre-air conditioning control. The driving source control means may execute the charge priority control when the operation frequency calculated by the calculating means is equal to or higher than a predetermined level, and may execute the normal control when the operation frequency is lower than the predetermined level. Therefore, there is no need to provide setting means and the cost of the device can thus be reduced. In addition, the vehicle occupant can be saved from performing the troublesome operation.

Specifically, the calculating means may calculate the operation frequency based on an interval between instructions for executing the pre-air conditioning. In this case, for example, the operation frequency may be set to increase as the instruction interval shortens. The driving source control means executes the charge priority control when the operation frequency is equal to or higher than the predetermined level. Consequently, the control can be switched optimally between the charge priority control and the normal control in accordance with the vehicle occupant, and the fuel efficiency and the operation of the pre-air conditioning can both be achieved appropriately.

Furthermore, the calculating means can calculate the the operation frequency, a percentage of the number of times the execution of the pre-air conditioning is instructed to the number of times an ignition switch of the vehicle is turned on. In this case, the driving source control means executes the charge priority control when the percentage of the number of the instructions for executing the pre-air conditioning is high and the operation frequency is equal to or higher than the predetermined level. Consequently, the control can be switched optimally between the charge priority control and the normal control according to the vehicle occupant, and the fuel efficiency and the operation of the pre-air conditioning can both be achieved appropriately.

Moreover, the air conditioner for vehicles according to the first and second aspects of the present invention may further include detecting means for detecting a charge amount of the electric storage means and determination means for determining whether or not the charge amount detected by the detecting means is equal to or more than a predetermined required amount which enables execution of the pre-air conditioning control. The driving source control means may drive the engine to make the charge amount become equal to or more than the required amount, when the charge amount is determined to be less than the predetermined required amount. Accordingly, the pre-air conditioning can be executed constantly. Note that this control may be executed constantly while the vehicle is being driven (is running). Alternatively, for example, the driving source control means may drive the engine until the charge amount becomes equal to or more than the required amount, when the charge amount at the time when the ignition switch of the vehicle is turned off is less than the required amount. In this case, driving of the vehicle is stopped when the charge amount of the electric storage means is equal to or more than the required amount. Therefore, the pre-air conditioning can be constantly executed more reliably.

As described above, the invention has effects of increasing the probability that pre-air conditioning will be executed and inhibiting an increased occurrence of a situation in which the inside of a vehicle is not in a comfortable state before a vehicle occupant boards the vehicle.

BEST MODE FOR CARRYING OUT THE INVENTION

First Embodiment

Hereafter, an example of a first embodiment of the invention will be described in detail with reference to the drawings. In this embodiment, a case in which the invention is applied to a hybrid vehicle that uses an engine and an electric motor as a driving source is explained.

Figure 1:
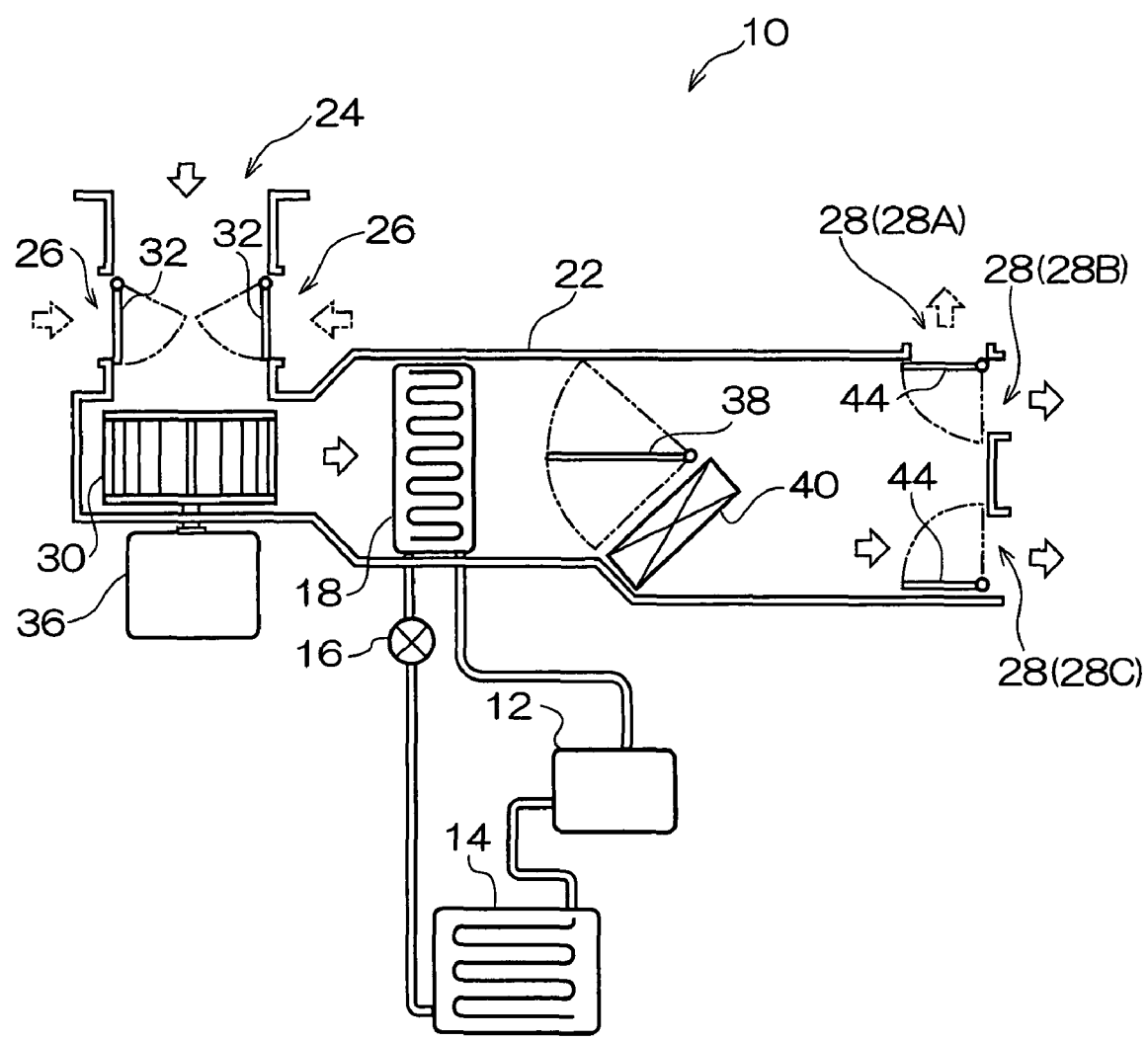
FIG. 1 is a schematic view showing the overall structure of an air conditioner for vehicles according to the invention.

FIG. 1 shows the overall structure of a vehicle air conditioner 10 according to this embodiment of the invention. As shown in FIG. 1, a refrigeration cycle of the vehicle air conditioner 10 is structured by a refrigerant circuit which includes a compressor 12 as a compressing unit, a condenser 14 as a condensing unit, an expansion valve 16 as a decompressor, and an evaporator 18 as an evaporating unit.

For example, when an engine of a vehicle is in operation, the compressor 12 is driven by power from the engine transmitted via a belt (not shown). When the engine is not in operation, the compressor 12 is driven by power from an electric motor 70 (refer to FIG. 2). The compressor 12 compresses a low pressure gas phase refrigerant into an overheated gas phase refrigerant with high temperature and high pressure.

Various types of compressors may be used as the compressor 12, but in this embodiment, a known variable capacity compressor is used for explanation. In this type of the compressor 12, an electromagnetic valve 20 (refer to FIG. 2) of the compressor 12 is controlled by changing a current value of the current applied to the electromagnetic valve 20 or by changing a duty ratio. In addition, an intake pressure of the refrigerant can be changed by changing a stroke of a piston of the compressor 12. Consequently, a refrigerant circulation volume, that is, a cooling capacity, of the compressor 12 is controlled.

The condenser 14 is a heat exchanger for performing heat exchange between the outside air and the refrigerant which is disposed downstream of the compressor 12. The condenser 14 cools the overheated gas phase refrigerant discharged from the compressor 12 and condenses it into a liquid phase refrigerant. The liquid phase refrigerant discharged from the condenser 14 is depressurized by the expansion valve 16 to a low pressure liquid phase.

The expansion valve 16 disposed at the upstream side of the evaporator 18 rapidly depressurizes the liquefied refrigerant into mist and supplies the refrigerant mist to the evaporator 18. Accordingly, vaporization efficiency of the refrigerant using the evaporator 18 can be improved.

The evaporator 18 is a heat exchanger for vaporizing a low pressure liquid phase refrigerant into a low pressure gas phase refrigerant. The refrigerant liquefied by pressurization is vaporized, and thereby air passing through the evaporator 18 (hereafter referred to as the air processed by the evaporator) is cooled. In this case, in the evaporator 18, water in the air is condensed by cooling the passing air and, as a result, the air processed by the evaporator is dehumidified.

The evaporator 18 is disposed inside an air conditioning duct 22. The air conditioning duct 22 has open ends at both ends thereof, and one of the open ends is provided with air inlets 24 and 26. In addition, the other open end is provided with a plurality of air outlets 28 (28A, 28B, and 28C are shown as an example in this embodiment) that open to the inside of the vehicle.

The air inlet 24 is connected to the outside of the vehicle so that outside air can be introduced into the air conditioning duct 22. Furthermore, the air inlet 26 is also connected to the inside of the vehicle so that air inside the vehicle (inside air) can be introduced into the air conditioning duct 22. In addition, among the air outlets 28, for example, the air outlet 28A is a defroster outlet for blowing air toward the glass of a windshield (not shown) of the vehicle, the air outlet 28B is a side and center register outlet, while the air outlet 28C is a feet-area outlet.

A blower fan 30 is provided between the evaporator 18 and the air inlets 24 and 26 in the air conditioning duct 22. Moreover, an air inlet switching damper 32 is provided in the vicinity of the air inlets 24 and 26. The air inlet switching damper 32 opens and closes the air inlets 24 and 26 by operation of an actuator such as a servo motor 34 (refer to FIG. 2).

The blower fan 30 rotates by operation of a blower motor 36 and draws air into the air conditioning duct 22 from the air inlet 24 or the air inlet 26. The drawn air is then fed to the evaporator 18. In this case, outside air or inside air is introduced into the air conditioning duct 22 depending on whether the air inlets 24 and 26 have been switched to an open or closed position by operation of the air inlet switching damper 32.

More specifically, an inside air circulation mode in which the inside air is introduced into the air conditioning duct 22 becomes effective when the air inlet 24 is closed by the air inlet switching damper 32. On the other hand, when the air inlet 26 is closed by the air inlet switching damper 32, an outside air introduction mode in which the outside air is introduced into the air conditioning duct 22 becomes effective.

An air mix damper 38 and a heater core 40 are provided at the downstream side of the evaporator 18. The air mix damper 38 is rotated by operation of a servo motor 42 (refer to FIG. 2) and regulates the amount of air processed by the evaporator 18 which passes through the heater core 40 and the amount which bypasses the heater core 40. The heater core 40 heats the air guided by the air mix damper 38.

The air processed by the evaporator 18 is guided to the heater core 40 in accordance with an opening angle of the air mix damper 38 and heated. Subsequently, the heated air is mixed with air that has not been heated by the heater core 40, and then fed to the air outlet 28. In the vehicle air conditioner 10, the air mix damper 38 is controlled to regulate the amount of air that is heated by the heater core 40, and thereby the temperature of the air discharged from the air outlet 28 to the inside of the vehicle is controlled.

Air outlet switching dampers 44 are provided in the vicinity of the air outlets 28. With the vehicle air conditioner 10, the temperature-controlled air can be blown into the vehicle from a desired position by opening and closing the air outlets 28A, 28B, and 28C using the air outlet switching dampers 44. Note that, in the illustrations, the air outlet switching dampers 44 are operated by the vehicle air conditioner 10 driving the servo motor 46 in accordance with a set driving mode. However, the air outlets 28 can be opened or closed mechanically by manual operation by a vehicle occupant.

Figure 2:
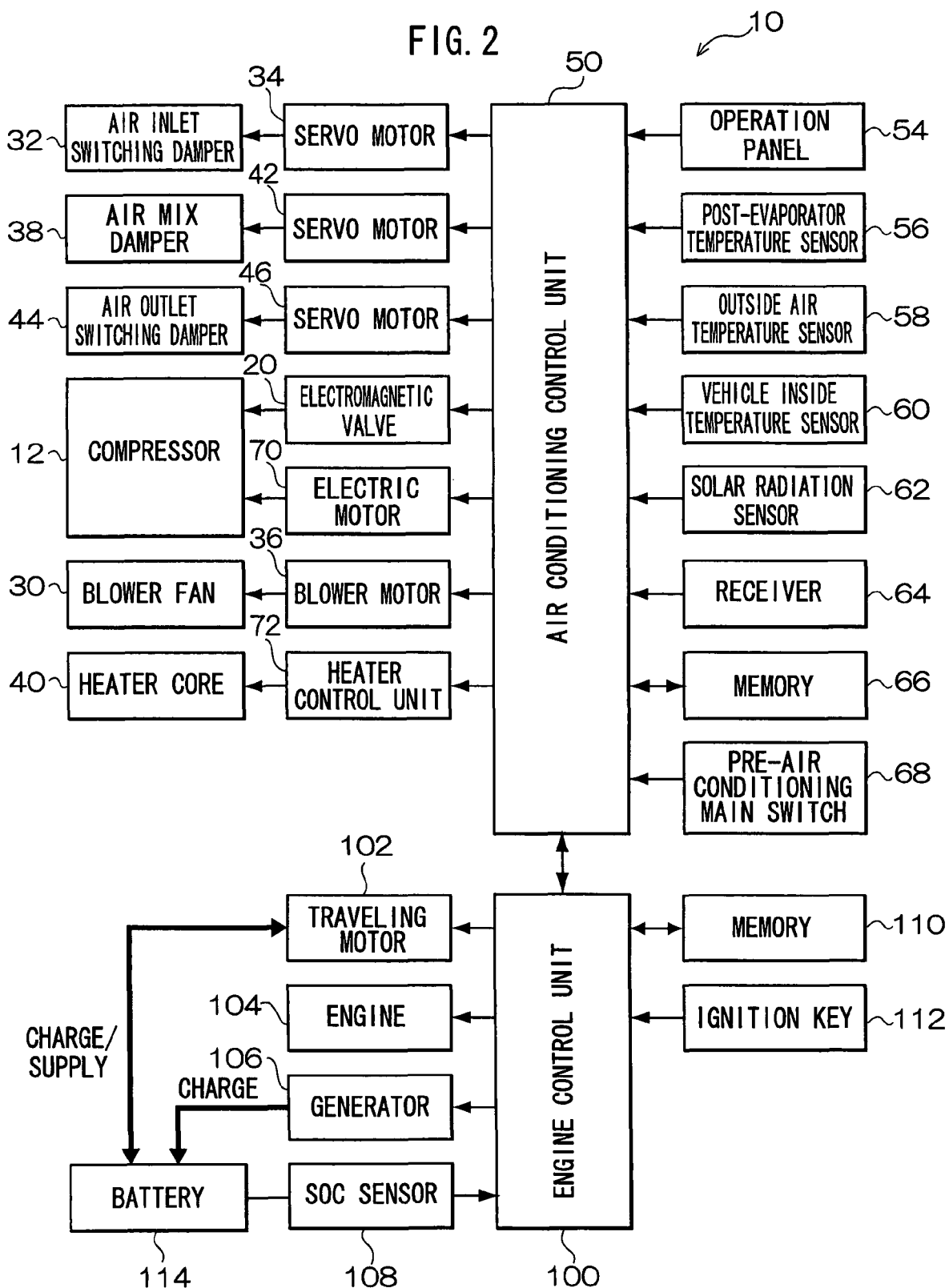
FIG. 2 is a block diagram illustrating the overall structure of a control system of the air conditioner for vehicles according to a first embodiment of the invention.

Next, the structure of the control system of the vehicle air conditioner 10 according to the embodiment is explained. FIG. 2 shows a block diagram of an overview of the control system of the vehicle air conditioner 10 according to the embodiment.

The vehicle air conditioner 10 includes an air conditioning control unit 50 that is configured by a microcomputer including a ROM, a RAM, a CPU and the like (not shown).

The air conditioning control unit 50 is connected with the servo motor 34 for driving the air inlet switching damper 32, the servo motor 42 for driving the air mix damper 38, the servo motor 46 for driving the air outlet switching damper 44, the electromagnetic valve 20 for controlling an intake pressure of the compressor 12, the electric motor 70 for driving the compressor 12, the blower motor 36 for driving the blower fan 30, and a heater control unit 72 for controlling the heater core 40.

In addition, the air conditioning control unit 50 is connected with an operating panel 54 that is used to set an operation mode (air conditioning conditions). The operating panel 54 may be used to perform setting of the operation mode such as selecting between manual and automatic modes for setting the air conditioning temperature inside the vehicle and the air volume of the blower fan 30, in addition to setting the air inlet and air outlets. Also, setting of the outside air introduction mode or the inside air circulation mode, and setting of the air outlet 28 for discharging the temperature-controlled air may be performed. The vehicle air conditioner 10 operates based on the air conditioning conditions set by a vehicle occupant operating the operating panel 54. Note that the air conditioning conditions set by the vehicle occupant are stored in a memory 66 which will be explained later.

Furthermore, the vehicle air conditioner 10 is provided with a post-evaporator temperature sensor 56 for detecting a temperature of the air processed by the evaporator (hereafter referred to as the post-evaporator temperature), an outside air temperature sensor 58 for detecting a temperature of the air outside the vehicle, a vehicle interior temperature sensor 60 for detecting a temperature inside the vehicle, a solar radiation sensor 62, a receiver 64, the nonvolatile memory 66 such as a flash ROM, and a pre-air conditioning main switch 68. Each of these elements is connected with the air conditioning control unit 50.

The post-evaporator temperature sensor 56 which is configured by a thermistor or the like, detects the temperature of the air processed by the evaporator as a resistance change, and outputs a post-evaporator temperature signal corresponding to the temperature of the air processed by the evaporator to the air conditioning control unit 50. The post-evaporator temperature sensor 56 is disposed at the rear of the evaporator 18.

The outside air sensor 58 which is configured by a thermistor or the like, detects an outside air temperature as a resistance change, and outputs an outside air temperature signal corresponding to the outside air temperature to the air conditioning control unit 50. The outside air temperature sensor 58 is disposed, for example, below a front bumper reinforcement of the vehicle.

The vehicle interior temperature sensor 60 which is configured by a thermistor or the like, detects a temperature inside the vehicle as a resistance change, and outputs an inside air temperature signal corresponding to the vehicle interior temperature to the air conditioning control unit 50. The vehicle interior temperature sensor 60 is disposed, for example, at a certain position in an instrument panel of the vehicle.

The solar radiation sensor 62 is configured by light detection means or the like such as a photodiode, and outputs a solar radiation level signal corresponding to a solar radiation level to the air conditioning control unit 50. The solar radiation sensor 62 is disposed, for example, near a defroster outlet on the instrument panel upper portion of the vehicle.

Figure 3A:
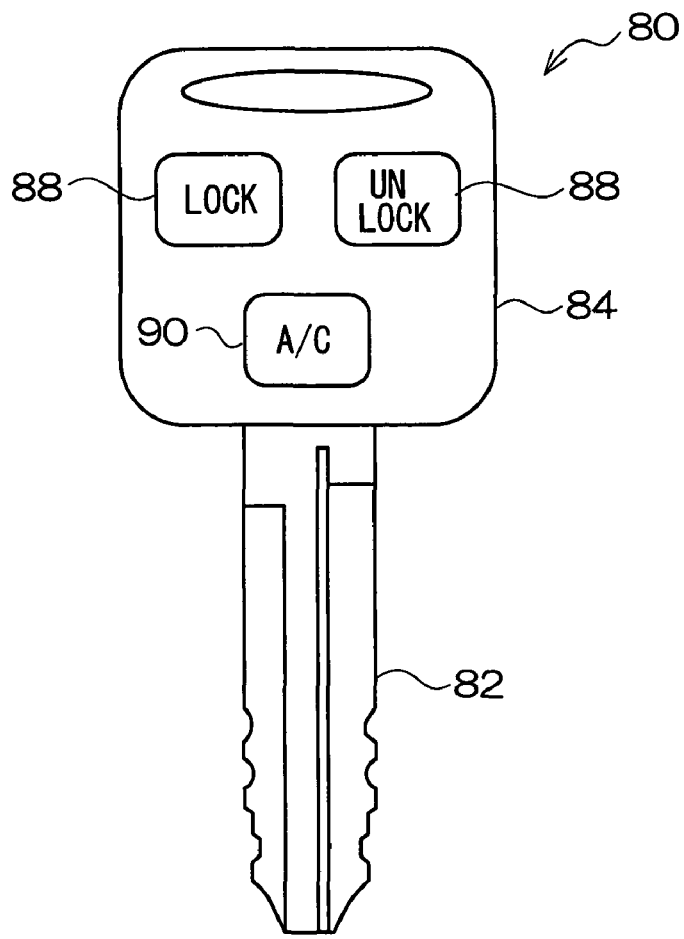
FIG. 3A is an overview of a remote control key.
Figure 3B:
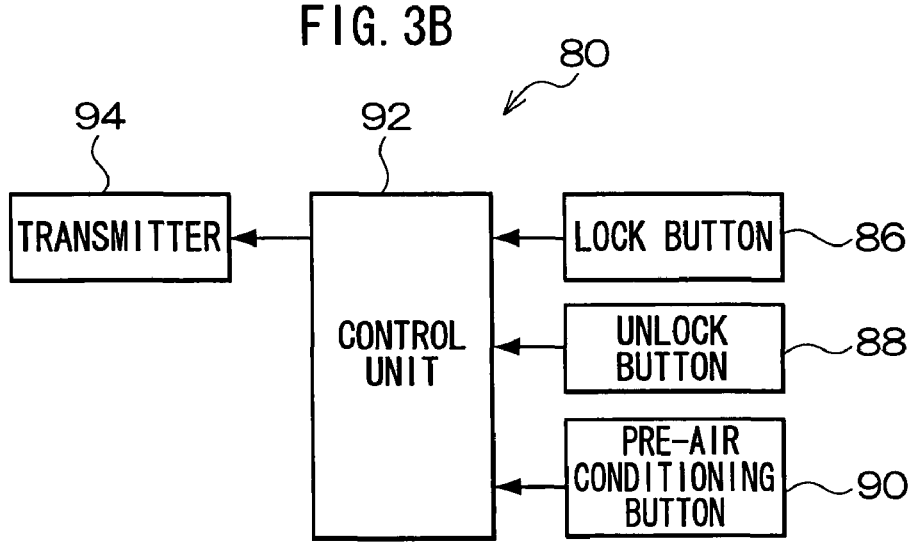
FIG. 3B is a block diagram of an overview of the remote control key.

The receiver 64 receives various signals transmitted from a remote control key 80 of the vehicle as shown in FIG. 3A and FIG. 3B.

The memory 66 stores a control program of a pre-air conditioning control routine which will be explained later, the air conditioning conditions set by the vehicle occupant, and the like.

A pre-air conditioning main switch 68 is a switch used by the vehicle occupant to set whether or not to allow execution of the pre-air conditioning which will be explained later. When this switch is turned on, execution of the pre-air conditioning is allowed. On the other hand, when the switch is turned off, execution of the pre-air conditioning is prohibited.

The remote control key 80 is, as shown in FIG. 3A, structured such that a holding portion 84 is attached to a key portion 82 which is inserted into a key hole of the vehicle. The holding portion 84 is provided with a lock button 86 for locking vehicle doors, an unlock button 88 for unlocking vehicle doors, and a pre-air conditioning button 90 for instructing execution of the pre-air conditioning, which will be explained later.

FIG. 3B is a block diagram of a control system of the remote control key 80. As shown in FIG. 3B, the remote control key 80 is configured by connecting the lock button 86, the unlock button 88, the pre-air conditioning button 90, and a transmitter 94 with a control unit 92 configured by a microcomputer including a ROM, a RAM, a CPU and the like (not shown).

When the lock button 86 is pressed, the control unit 92 directs the transmitter 94 to radio-transmit a lock signal indicating that the lock button 86 is pressed. When this signal is received by the vehicle, the doors of the vehicle are locked. Likewise, when the unlock button 88 is pressed, the control unit 92 directs the transmitter 94 to radio-transmit an unlock signal indicating that the unlock button 88 is pressed. When this signal is received by the vehicle, the doors of the vehicle are unlocked.

Furthermore, when the pre-air conditioning button 90 is pressed, the control unit 92 directs the transmitter 94 to radio-transmit a pre-air conditioning signal indicating that the pre-air conditioning button 90 is pressed. When this signal is received by the vehicle and the pre-air conditioning main switch 68 described above is turned on, the pre-air conditioning control, which will be explained later, is executed.

When the air conditioning conditions including temperature (set temperature) are set during a normal air conditioning operation, the air conditioning control unit 50 controls air conditioning of the interior of the vehicle based on the air conditioning conditions and the environment conditions (such as outside air temperature, vehicle interior temperature, and solar radiation level).

For instance, when the automatic mode is set, a target air blow temperature (a target temperature of the air discharged from the air outlets) to achieve a set temperature inside the vehicle, an opening angle of the air mix damper 38, a blower level (air volume of the blower fan 30), the air inlet and outlet, and the like are set based on the set temperature and the environment conditions. Then, based on these setting results, an intake pressure of the compressor 12 (capacity of compressor 12) and each motor for driving the blower fan 30, the air inlet switching damper 32, the air mix damper 38, the air outlet switching damper 44 and the like are controlled, thereby air-conditioning the inside of the vehicle.

In addition, when the manual mode (automatic mode OFF) is set, the target air blow temperature, the opening angle of the air mix damper 38 and the like are set based on the set temperature and the environment conditions. Then, based on these settings and the air conditioning conditions including the air inlet, the air outlet, and the blower level selected by operation of the operating panel 54, the intake pressure of the compressor 12 and each motor for driving the blower fan 30, the air inlet switching damper 32, the air mix damper 38, the air outlet switching damper 44 and the like are controlled, thereby air-conditioning the inside of the vehicle.

Moreover, the air conditioning control unit 50 executes the pre-air conditioning control, which will be explained later, when the receiver 64 receives the pre-air conditioning signal transmitted from the remote control key 80 when no vehicle occupant is in the vehicle and also when the air conditioning main switch 68 is turned on. The pre-air conditioning control air conditions the inside of the vehicle before the vehicle occupant boards the vehicle and thus improves comfort when the vehicle occupant boards the vehicle.

Furthermore, the air conditioning control unit 50 is connected with an engine control unit 100. The engine control unit 100 is connected with a traveling motor 102, an engine 104, a generator 106, an SOC (State of Charge) sensor 108, a memory 110, and an ignition key 112.

The engine control unit 100 makes the vehicle run by driving at least one of the engine 104 and the traveling motor 102 to supply power to at least one of front and rear wheels of the vehicle.

The generator 106 is driven by the operation of the engine 104, and the power generated is stored in a battery 114. Note that regenerative power generated during deceleration while the vehicle is being driven by the traveling motor 102 is also stored in the battery 114. The SOC sensor 108 detects a remaining capacity (charge capacity) of the battery 114.

The engine control unit 100 drives the traveling motor 102 to run the vehicle when the remaining capacity of the battery 114 which is detected by the SOC sensor 108 is equal to or higher than a capacity required for driving the vehicle by the traveling motor 102, or when efficiency related to engine fuel consumption (hereafter referred to as the engine efficiency) is low such as during engine start-up, low-speed running, and running on a gentle downhill slope. On the other hand, when the battery remaining capacity is lower than the capacity required for driving the vehicle by the traveling motor 102, or when the engine efficiency is high such as during medium- or high-speed running, the engine control unit 100 drives the engine 104 to run the vehicle. Moreover, during acceleration, rapid acceleration, and the like, the engine 104 is driven to run the vehicle and the traveling motor 102 is also driven to assist driving force of the engine 104.

The memory 110 stores a program of the control routine executed by the engine control unit 100, which will be explained later, as well as various parameters.

Note that the traveling motor 102 and the generator 106 are separately structured in this embodiment. However, the traveling motor 102 and the generator 106 may be structured as a single unit that serves both functions.

Next, the control routine executed by the engine control unit 100 and the air conditioning control unit 50 is explained as an operation of the present embodiment.

Figure 4:
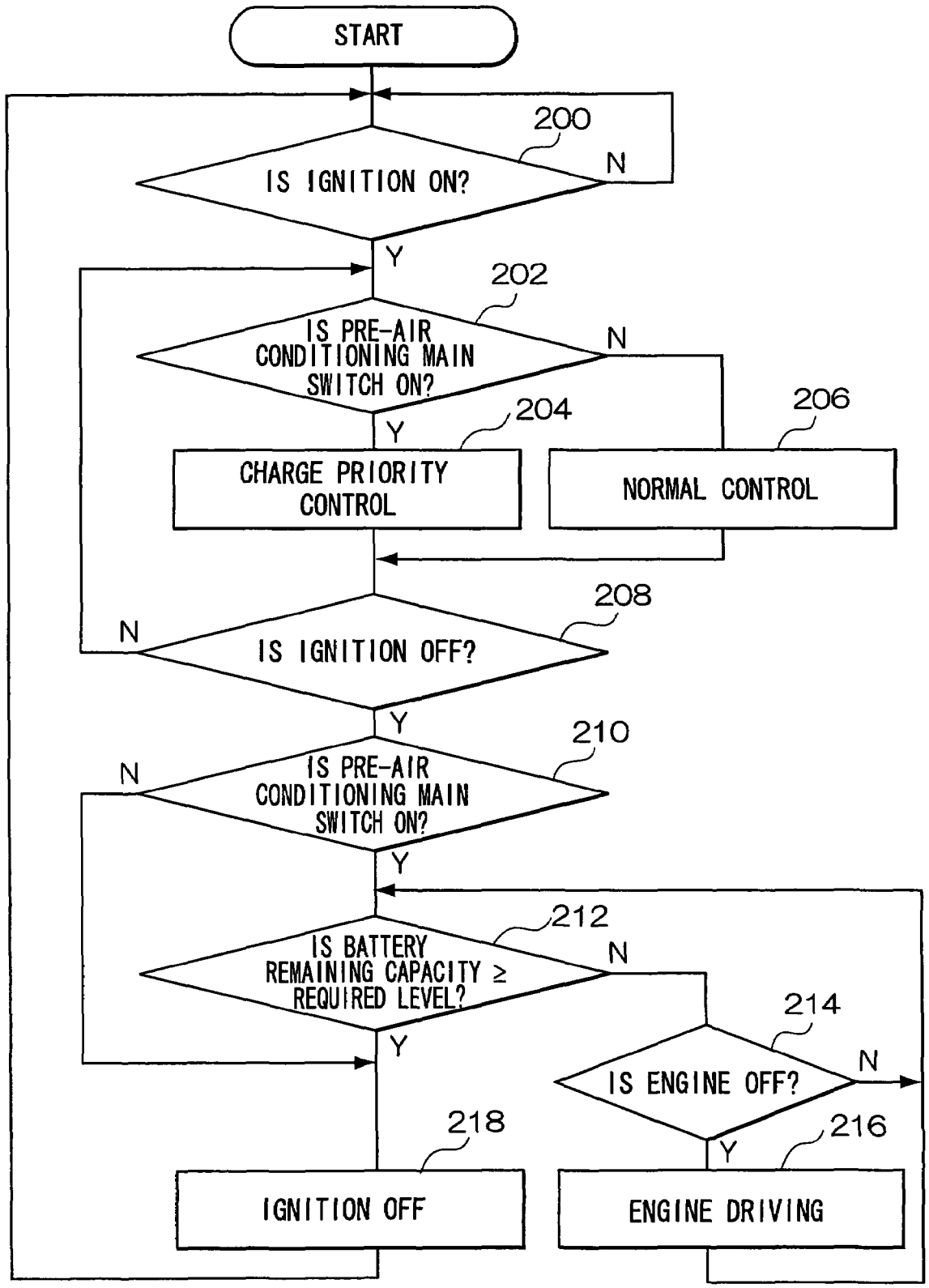
FIG. 4 is a flowchart illustrating a control routine executed by an engine control unit according to the first embodiment.

First, a description of the control routine executed by the engine control unit 100 is given with reference to a flowchart shown in FIG. 4.

At step 200, it is determined whether or not the ignition key 112 of the vehicle is turned on. When the ignition key 112 is turned on, the process proceeds to step 202.

At step 202, it is determined if the pre-air conditioning main switch 68 is turned on. This can be determined by inquiring of the air conditioning control unit 50 whether or not the pre-air conditioning main switch 68 is to be turned on.

Then, if the pre-air conditioning main switch 68 is turned on, the process proceeds to step 204 to execute a charge priority control. On the other hand, if the pre-air conditioning main switch 68 is turned off, the process proceeds to step 206 to execute a normal control.

In this case, the charge priority control controls the operation of the traveling motor 102 and the engine 104 so that charging of the battery 114 is prioritized over the fuel efficiency of the engine 104. The normal control controls the operation of the traveling motor 102 and the engine 104 so that the fuel efficiency of the engine 104 is prioritized over charging of the battery 114.

More specifically, the charge priority control controls an operation ratio of the engine 104 to be higher than that in the normal control, thereby increasing power generation efficiency of the generator 106 to charge the battery 114. For example, even in a range in which a vehicle must primarily be driven by the traveling motor 102, that is in a range in which the engine efficiency is relatively low such as when running at low speed or running on a gentle downhill slope, the vehicle is driven by the engine 104 to charge the battery 114.

Subsequently, at step 208, it is determined whether or not the ignition key 112 is turned off, that is, if the operation of the vehicle is stopped. If it is determined that the ignition key 112 is turned off, the process proceeds to step 210. If the ignition key 112 is not turned off, the process returns to step 202 to repeat the same processing as above. That is, if the pre-air conditioning main switch 68 is turned on, the charge priority control is executed, and if the pre-air conditioning main switch 68 is turned off, the normal control is executed.

At step 210, it is determined whether or not the pre-air conditioning main switch 68 is set to be turned on in the same manner as at step 202. Then, if the pre-air conditioning main switch 68 is set to be turned on, the process proceeds to step 212. If the pre-air conditioning main switch 68 is set to be turned off, the process proceeds to step 218.

At step 212, the remaining capacity of the battery 114 detected by the SOC sensor 108 is retrieved, and it is determined whether or not the remaining capacity is equal to or higher than a predetermined required level necessary for executing the pre-air conditioning.

When the remaining capacity of the battery 114 is equal to or higher than the required level, the process proceeds to step 218 and turns off ignition, that is, stops driving of the traveling motor 102 and the engine 104.

On the other hand, if the remaining capacity of the battery 114 is lower than the required level, the process proceeds to step 214 to determine if the engine 104 is turned off, that is, if the operation of the engine 104 is stopped. Then, if the engine 104 is stopped, the process proceeds to step 216 at which the engine 104 is driven, and then returns to step 212. That is, if the remaining capacity of the battery 114 is lower than the required level when the ignition key 112 is turned off, and the engine 104 is driven until the required level or above is reached. Consequently, the remaining capacity of the battery 114 always becomes equal to or higher than the required level when the ignition is turned off. Therefore, the pre-air conditioning can be executed without fail when the execution of the next pre-air conditioning is instructed.

Note that the processes at steps 210 to 216 may be omitted. In this case, the pre-air conditioning is not necessarily executed, but if the pre-air conditioning main switch 68 is turned on, the charge priority control is executed, thereby increasing the probability that pre-air conditioning will be executed as compared to the known technology. Furthermore, if the processes at step 210 to 216 are omitted, whether or not the remaining capacity of the battery 114 is equal to or higher than the required level may be determined by the charge priority control at step 204, and a control may be executed to drive the engine 104 until the required level is reached. Accordingly, even if the processes at steps 210 to 216 are omitted, the remaining capacity of the battery 114 when the ignition is turned off always becomes equal to or higher than the required level. Consequently, the pre-air conditioning can be executed without fail when the execution of the next pre-air conditioning is instructed.

Figure 5:
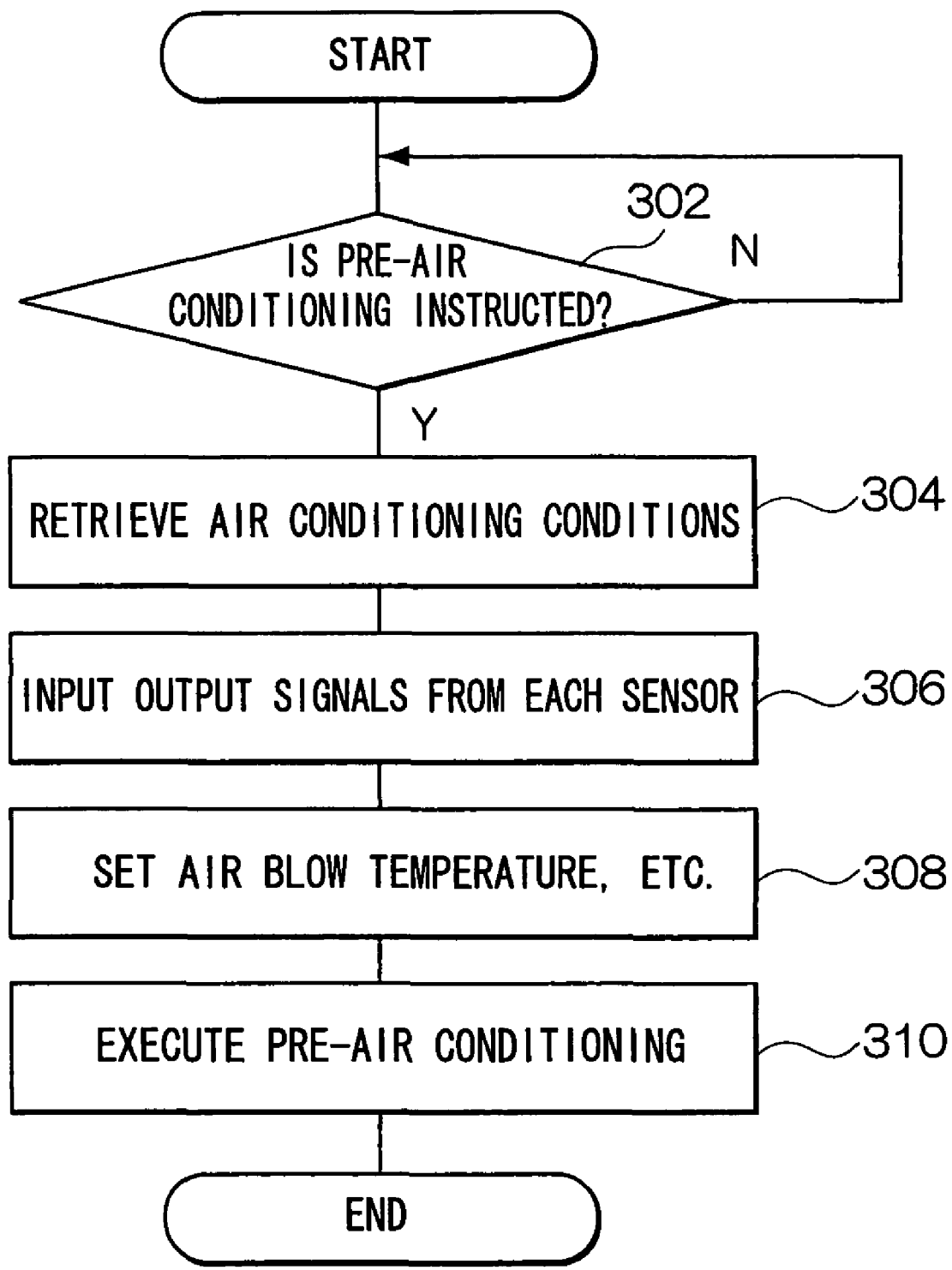
FIG. 5 is a flowchart illustrating a control routine executed by an air conditioning control unit according to the first embodiment.

Next, a description of the control routine executed by the air conditioning control unit 50 is given with reference to a flowchart shown in FIG. 5.

First, at step 302, it is determined whether or not the pre-air conditioning is instructed, that is whether or not a pre-air conditioning signal is received from the remote control key 80 when no vehicle occupant is in the vehicle. Note that the determination of whether or not a vehicle occupant is in the vehicle is made by determining, for example, whether or not the ignition key 112 is turned off.

Then, when a vehicle occupant outside of the vehicle presses the pre-air conditioning button 90 of the remote control key 80 and when a pre-air conditioning signal is received by the receiver 64, the process proceeds to step 304.

At step 304, air conditioning conditions stored in the memory 66 are retrieved. In the next step 306, environment conditions, namely, outside air temperature, vehicle interior temperature, and solar radiation level are input from each sensor.

At step 308, based on the air conditioning conditions (set temperature) and the environment conditions, a target air blow temperature is calculated and an opening angle of the air mix damper 38, a blower level, an air inlet, an air outlet, and the like are set.

The target air blow temperature $T_{AO}$ can generally be calculated by the following equation based on the set temperature $T_{SET}$, the vehicle interior temperature $T_R$, the outside air temperature $T_{AM}$, and the solar radiation level $T_S$.

$$T_{AO} = k_1 \cdot T_{SET} - k_2 \cdot T_R - k_3 \cdot T_{AM} - k_4 \cdot T_S + C \quad (1)$$

(Note that, $k_1$, $k_2$, $k_3$, $k_4$, and C are Predetermined Constants.)

At step 310, the pre-air conditioning is executed. That is, based on the set results at step 306, an intake pressure of the compressor 12, each motor which drives the blower fan 30, the air inlet switching damper 32, the air mix damper 38, the air outlet switching damper 44, and the like are controlled, thereby executing the pre-air conditioning of the interior of the vehicle.

Note that, when the pre-air conditioning is executed, capacity may be reduced as compared to that during the normal air conditioning that is executed during vehicle running or the like. This is because if the compressor 12, each motor, and the like are operated during vehicle stop in the same manner as during the normal air conditioning, a sudden drop in the battery capacity may occur depending on the environment conditions. In a case in which the air conditioning control is executed with reduced capacity, for instance, cooling operation and heating operation are set to be intermittently performed. In this case, the target air blow temperature is set higher than a normal target air blow temperature in the cooling operation, whereas the target air blow temperature is set lower than the normal target air blow temperature in the heating operation. Consequently, a sudden drop in the battery capacity can be inhibited. Note that, the level of capacity reduction during the pre-air conditioning can be adjusted according to the environment conditions.

Furthermore, before executing the pre-air conditioning, whether or not the pre-air conditioning can be executed may be determined. Then if the execution is determined to be possible, the pre-air conditioning may be executed. That is, it is determined if the remaining capacity of the vehicle battery is equal to or higher than the required level, and the pre-air conditioning is only executed if the capacity is equal to or higher than the required level. Consequently, the pre-air conditioning can be executed more safely.

Moreover, in addition to or in place of air conditioning the inside of the vehicle during the pre-air conditioning, pre-heating may be executed by operating a seat heater and a steering heater. Alternatively, a rear defogger, a mirror heater, a window heating system, a wiper deicer, and the like may be operated to remove frost beforehand. Also, a block heater for smooth engine start-up may be operated to improve engine start-up performance.

Second Embodiment

Next, a second embodiment of the invention will be explained. Note that the same structural members as in the first embodiment are denoted with the same reference characters and a detailed description thereof is omitted.

Figure 6:
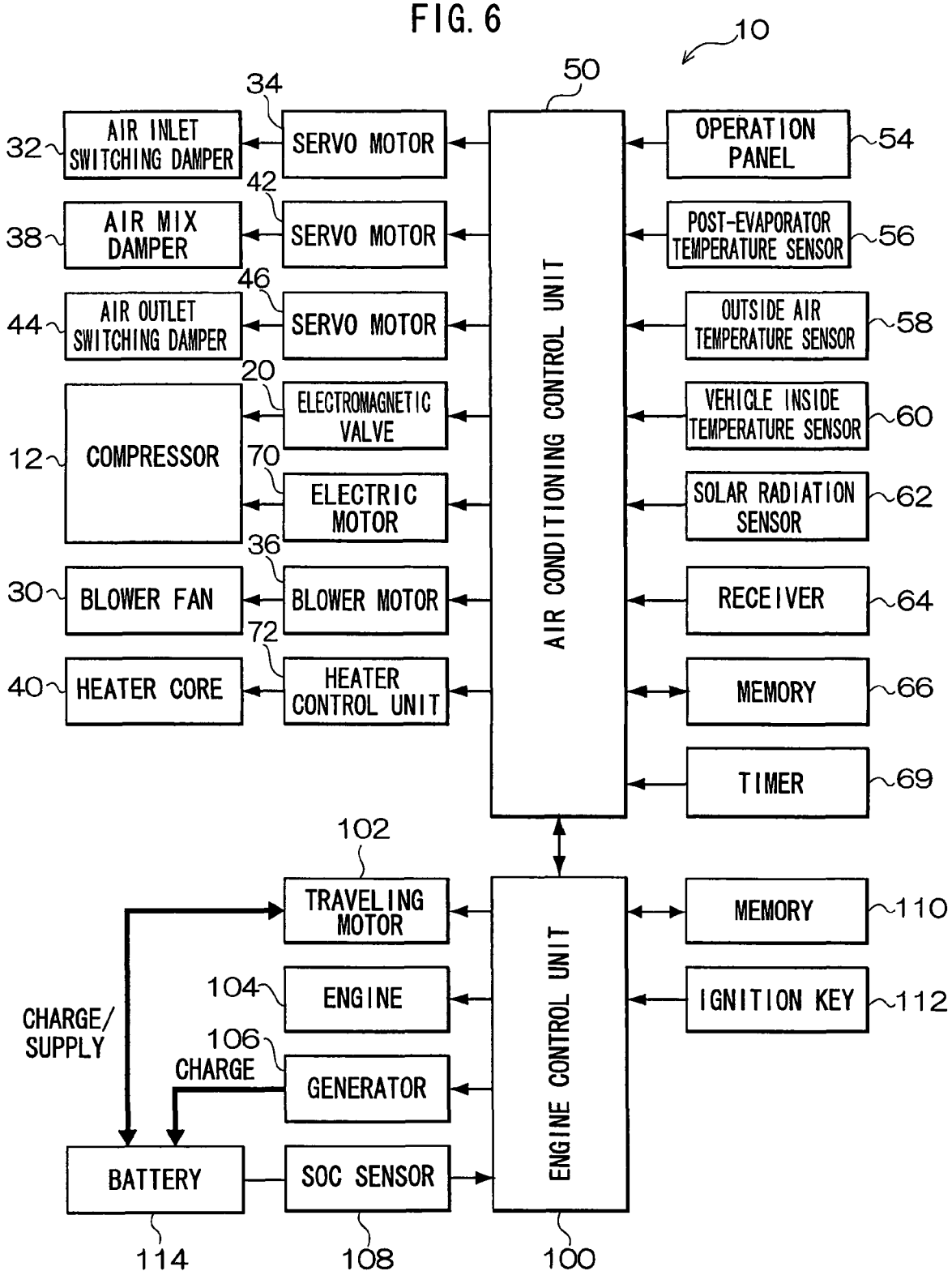
FIG. 6 is a block diagram illustrating the overall structure of the control system of the air conditioner for vehicles according to a second embodiment of the invention.

FIG. 6 shows a block diagram of a vehicle air conditioner 11 of the present embodiment. The vehicle air conditioner 11 differs from the vehicle air conditioner 10 in FIG. 2 only in that the pre-air conditioning main switch 68 is not provided but a timer 69 is provided. The rest of the structural members have similar configurations as those of the vehicle air conditioner 10, and thus a description thereof is omitted.

Figure 7:
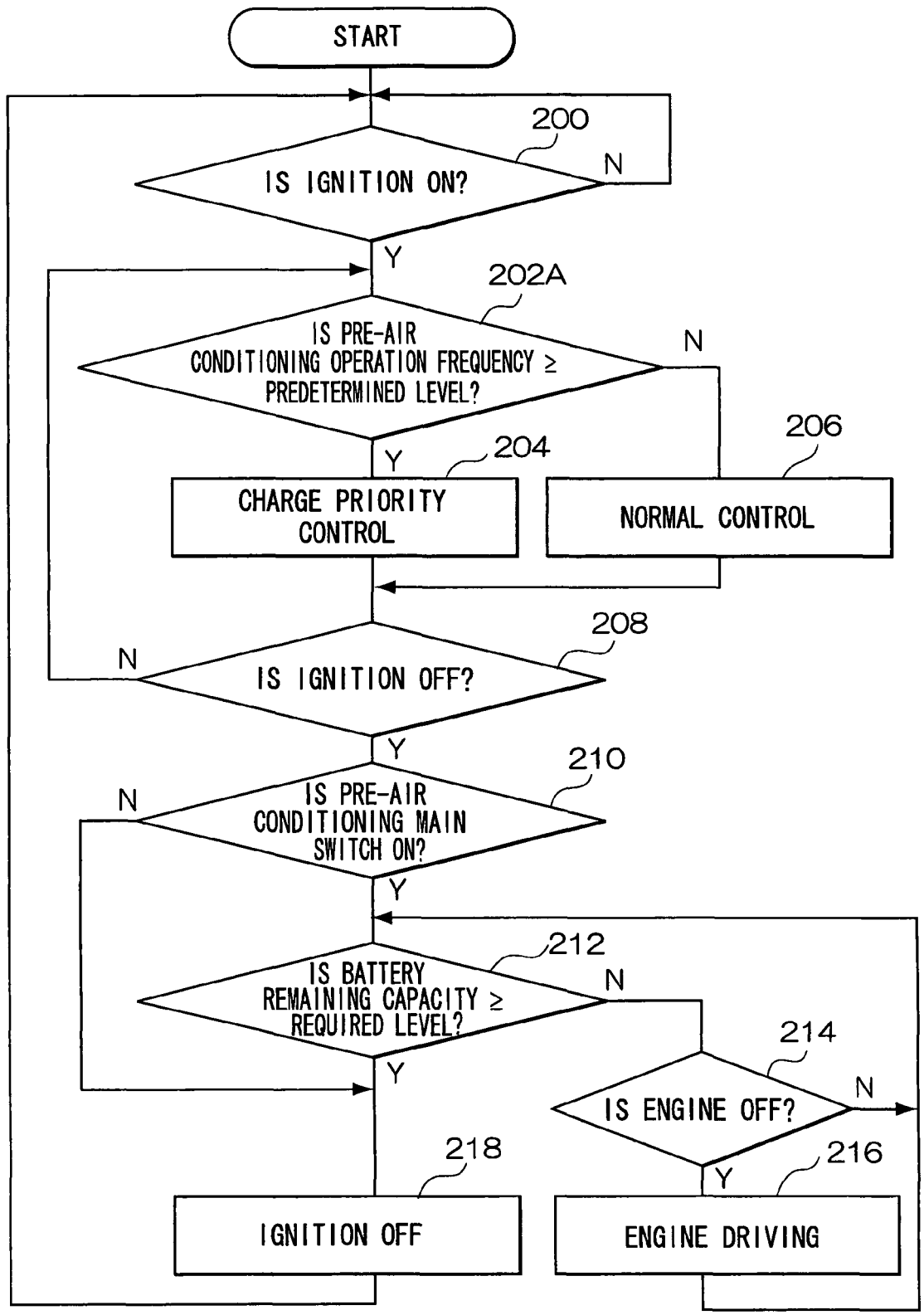
FIG. 7 is a flowchart illustrating a control routine executed by an engine control unit according to the second embodiment.

Next, a control routine executed by the engine control unit 100 is explained referring to a flowchart shown in FIG. 7. Note that a process not included in the flowchart of FIG. 4 is denoted with 'A' at the end of the step number.

As shown in FIG. 6, the only process that differs from the control routine shown in FIG. 4 is the process at step 202A, and therefore the explanations of the other processes are omitted.

At step 202A, it is determined whether or not the pre-air conditioning operation frequency is equal to or higher than a predetermined level. The pre-air conditioning operation frequency is calculated by the air conditioning control unit 50 which will be explained later. Accordingly, at step 202A, the air conditioning control unit 50 is inquired of as to whether or not the pre-air conditioning operation frequency is equal to or higher than the predetermined level, to and it is determined whether or not the pre-air conditioning operation frequency is equal to or higher than the predetermined level. Then, if the pre-air conditioning operation frequency is equal to or higher than the predetermined level, the charge priority control is executed at step 204, and if the pre-air conditioning operation frequency is less than the predetermined level, the normal control is executed at step 206.

Figure 8:
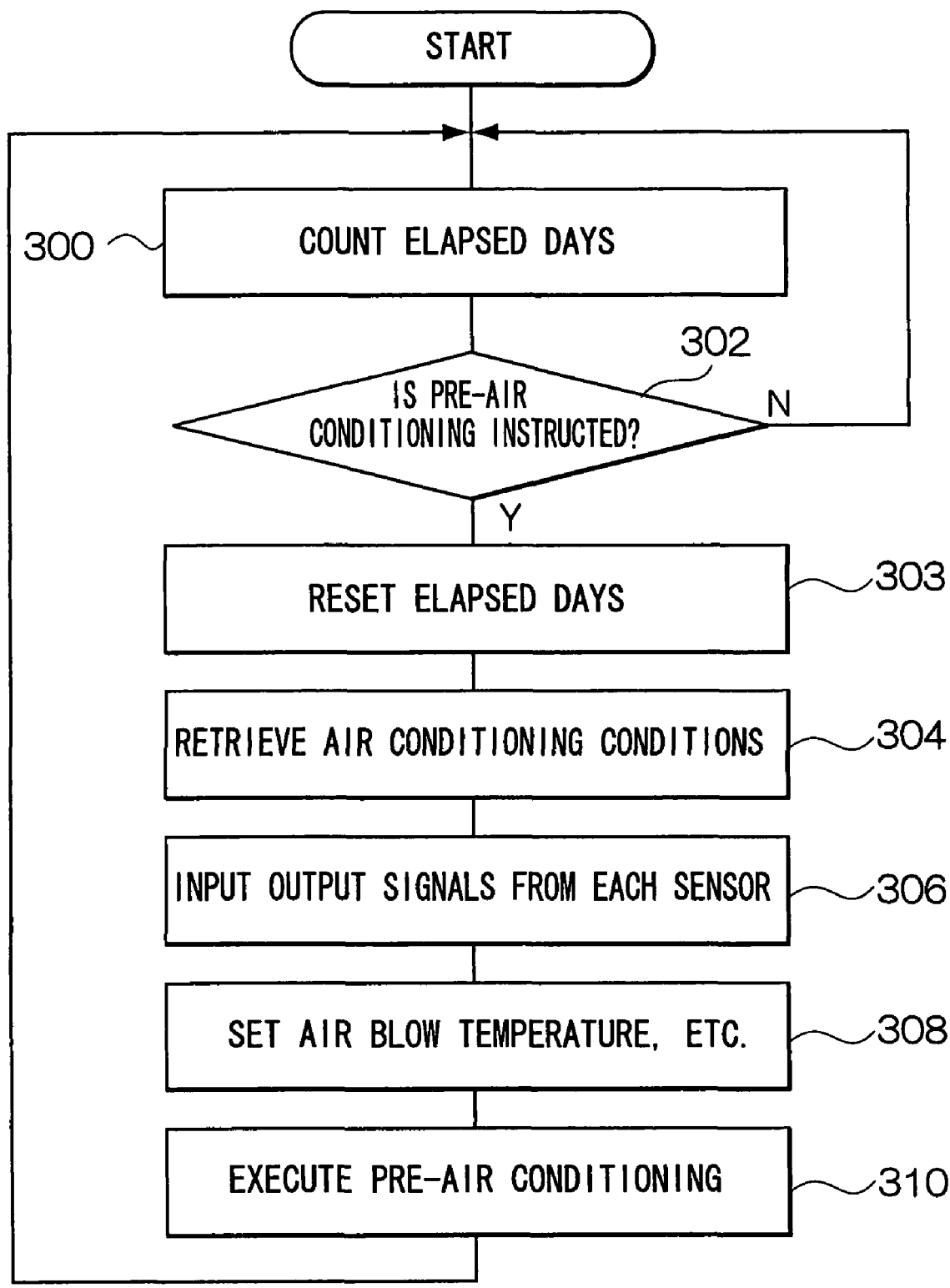
FIG. 8 is a flowchart illustrating a control routine executed by an air conditioning control unit according to the second embodiment.

Next, a control routine executed by the air conditioning control unit 50 is explained referring to a flowchart shown in FIG. 8. Note that steps in which the same processing as in the control routine shown in FIG. 5 is performed are denoted with the same numerical symbols, and a detail description thereof is omitted.

First, at step 300, the current time and date are obtained from the timer 69 and elapsed days are counted. In this process, the current time and date are obtained from the timer 69 at predetermined intervals, and the count value is incrementally increased each time the day is updated. Note that the elapsed days are reset to zero before the routine is executed.

Then, it is determined at step 302 whether or not the execution of the pre-air conditioning is instructed. If execution is instructed, the process proceeds to step 303, whereas if the execution is not instructed, the process returns to step 300 to count the elapsed days.

At step 303, the elapse days are reset, and the same processes as explained in the first embodiment are executed at steps 304 to 310.

That is, the counted number of elapsed days is the number of days from the time when pre-air conditioning is executed to the next time pre-air conditioning is executed, namely, pre-air conditioning execution intervals. In this embodiment, if the number of elapsed days is less than a predetermined threshold, the pre-air conditioning operation frequency is regarded as being the same or higher than a predetermined level. On the other hand, if the number of elapsed days is equal to or more than the predetermined threshold, the pre-air conditioning operation frequency is regarded as being less than the predetermined level. This information is stored in the memory 66. Subsequently, although not shown in the flowchart in FIG. 8, if a request is received from the engine control unit 100, whether or not the pre-air conditioning operation frequency is equal to or higher than the predetermined level is transmitted to the engine control unit 100. Further, the predetermined threshold is set to a value that presumes that the pre-air conditioning operation frequency is high when the number of elapsed days is less than the threshold and thus the remaining capacity of the battery 114 may not satisfy the required level necessary for pre-air conditioning. For example, if the case of a driver that drives on weekends only is considered, the predetermined threshold can be, for instance, 10 days. In this case, if the pre-air conditioning is not executed for 10 days, the pre-air conditioning operation frequency is low and the normal control is thus executed. On the other hand, if execution of the pre-air conditioning occurs within 10 days, the pre-air conditioning operation frequency is high and thus the charge priority control is executed.

At step 202A in FIG. 7, the engine control unit 100 determines if the pre-air conditioning operation frequency based on the number of elapsed days is equal to or higher than the predetermined level. If the frequency is equal to or higher than the predetermined level, the charge priority control is executed at step 204. If the frequency is lower than the predetermined level, the normal control is executed at step 206.

As described above, since the execution of the charge priority control is determined based on the pre-air conditioning operation frequency, efficient charging in accordance with each vehicle occupant can be realized, and compatibility of fuel economy with the operation of the pre-air conditioning can be achieved.

Figure 9:
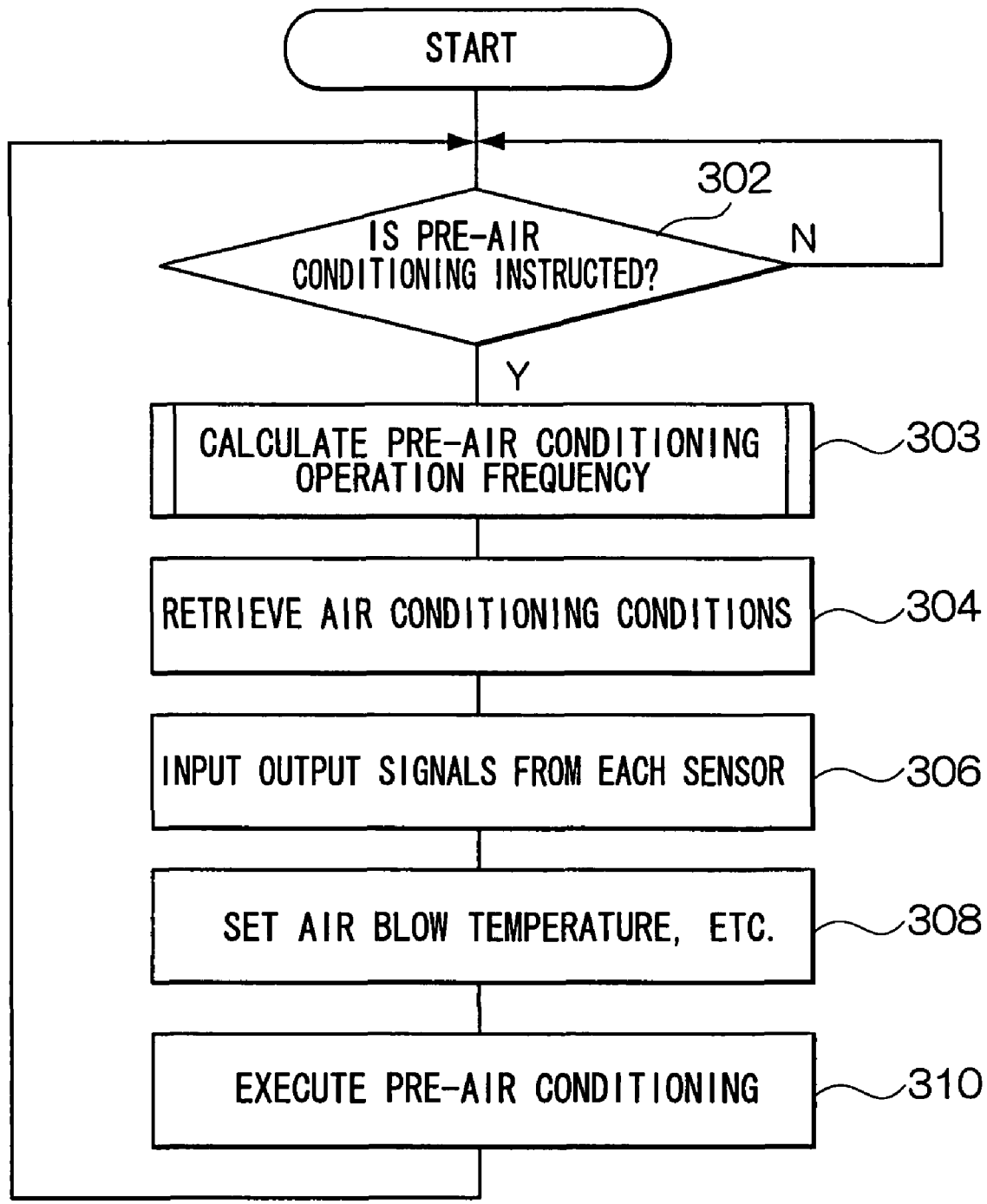
FIG. 9 is a flowchart illustrating a main routine executed by the air conditioning control unit according to the second embodiment.
Figure 10:
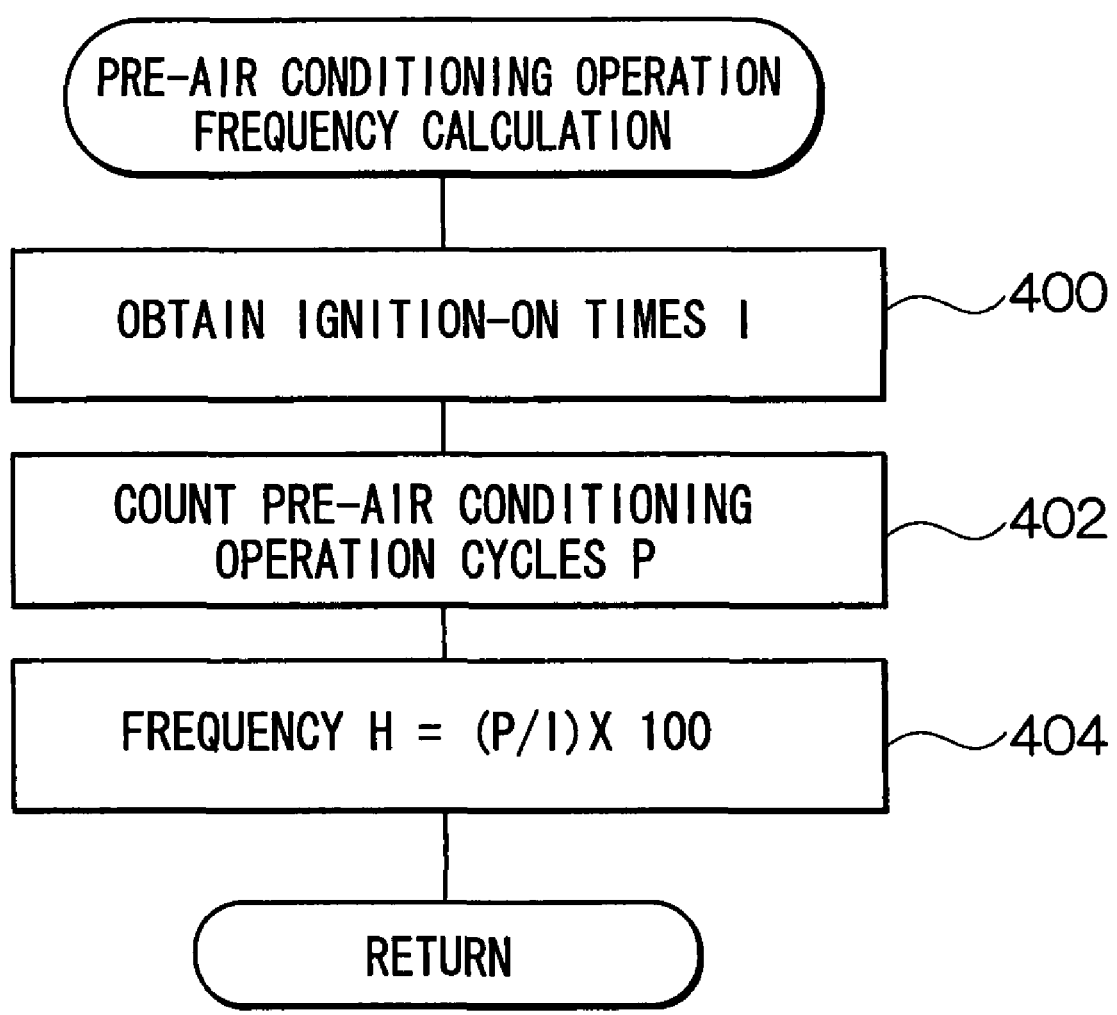
FIG. 10 is a flowchart illustrating a calculation routine for a pre-air conditioning operation frequency executed by the air conditioning control unit according to the second embodiment.

Furthermore, as shown in a flowchart of FIG. 9, a pre-air conditioning operation frequency calculation process as shown in FIG. 10 may be executed at step 303.

In this case, as shown in FIG. 10, the number of times I the ignition key 112 has been turned on is inquired as to and obtained from the engine control unit 100 at step 400. In the engine control unit 100, although not shown in the flowchart shown in FIG. 7, if it is determined that the ignition key 112 is turned on at step 200, the number of times I is increased by one and stored in the memory 110. Then, if an information request is received from the air conditioning control unit 50, the number of times I is transmitted to the air conditioning control unit 50.

Next, at step 402, the number of pre-air conditioning operation cycles P is increased by one and stored in the memory 66. Then, at step 404, a pre-air conditioning operation frequency H (%) is calculated by the following equation.

$$H=(P/I)\times 100 \quad (2)$$

That is, the pre-air conditioning operation frequency H represents a percentage of the number of times the pre-air conditioning is instructed to the number of times the ignition key 112 is turned on. Note that, although not shown in FIGS. 9 and 10, the air conditioning control unit 50 transmits the pre-air conditioning operation frequency H to the engine control unit 100 when a request for information about the pre-air conditioning operation frequency is received from the engine control unit 100.

At step 202A in FIG. 7, the engine control unit 100 determines whether or not the pre-air conditioning operation frequency is equal to or higher than the predetermined level. The predetermined level in this case is set to a value that assumes that the pre-air conditioning operation frequency is high when the pre-air conditioning frequency is equal to or higher than the value and thus the remaining capacity of the battery 114 may not satisfy the required level necessary for pre-air conditioning. For example, the predetermined level is set to 50(%).

Figure 11:
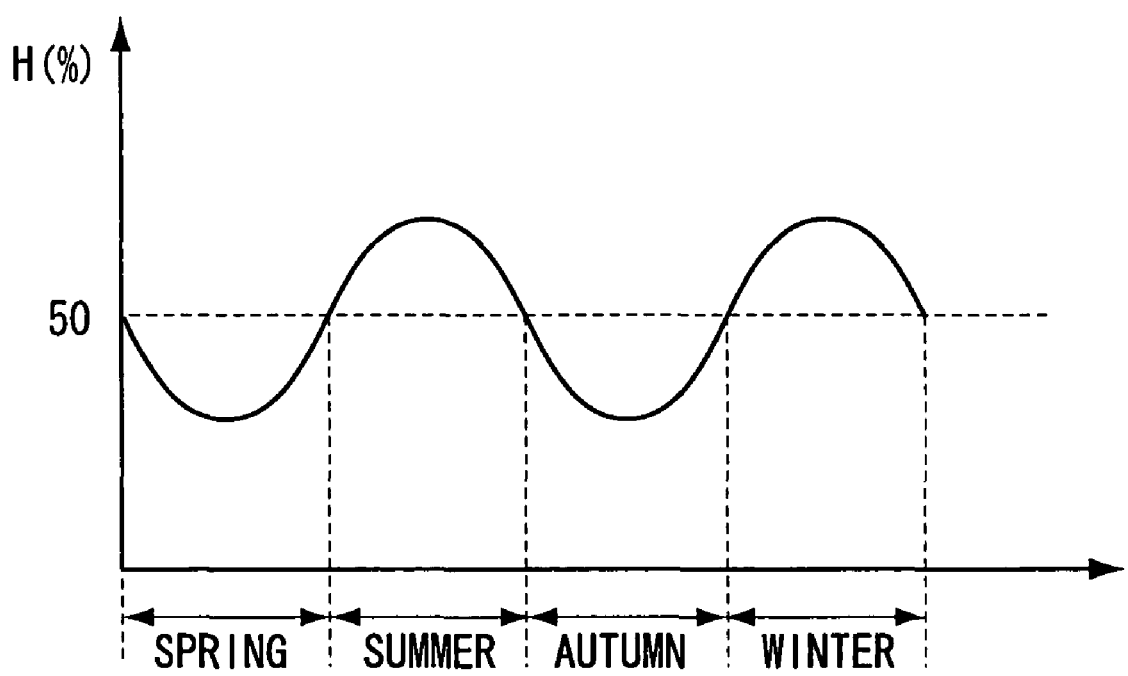
FIG. 11 is a diagram illustrating the relationship of seasons and the pre-air conditioning operation frequency.

In this case, as shown in FIG. 11, for example, the normal control is executed in spring and autumn since the pre-air conditioning operation frequency is below 50%. On the other hand, in summer and winter, the charge priority control is executed since the pre-air conditioning operation frequency is equal to or higher than 50%.

As described above, since the control is switched according to the pre-air conditioning operation frequency, the fuel economy and the operation of the pre-air conditioning can both be achieved appropriately according to the frequency with which the vehicle occupant executes the pre-air conditioning operation.

Note that the invention is applied to a hybrid vehicle in the aforementioned embodiments, but the invention is also applicable to a vehicle that uses only an engine as a driving source. In this case, the control can be switched between the charge priority control and the normal control by controlling the engine revolution and the like. For instance, in the charge priority control, the engine revolution may be increased as compared to that of the normal control.

INDUSTRIAL APPLICABILITY

The vehicle air conditioner of the invention can be utilized in, for example, a hybrid vehicle or at least a vehicle that uses an engine as a driving source, and is able to air-condition the inside of the vehicle before a vehicle occupant boards the vehicle.

The invention claimed is:

1. An air conditioner for vehicles that air-conditions an inside of a vehicle and that uses at least an engine as a driving source, comprising:
    an adjusting unit configured to adjust at least one of a temperature and an air volume of air discharged from an air outlet provided inside the vehicle using power supplied from an electric storage unit charged by driving the engine;
    a driving source control unit configured to select and execute either one of a charge priority control that controls the engine to prioritize charging of the electric storage unit over improvement of fuel efficiency of the engine, and a normal control that controls the engine to prioritize the improvement of the fuel efficiency of the engine;
    an air conditioning control unit configured to execute a pre-air conditioning control on the adjusting unit, using the power supplied from the electric storage unit, to air-condition the inside of the vehicle before a vehicle occupant boards the vehicle; and
    a calculating unit configured to calculate an operation frequency of the execution of the pre-air conditioning control by the air conditioning control unit, wherein
    the driving source control unit executes the charge priority control when the operation frequency calculated by the calculating unit is equal to or higher than a predetermined level based on a frequency of execution of the pre-air conditioning control, and executes the normal control when the operation frequency is lower than the predetermined level.

2. The air conditioner for vehicles according to claim 1, wherein the calculating unit calculates the operation frequency based on an interval between instructions for executing the pre-air conditioning control.

3. The air conditioner for vehicles according to claim 1, wherein the calculating unit calculates, as the operation frequency, a percentage of the number of times the execution of the pre-air conditioning control is executed to the number of times an ignition switch of the vehicle is turned on.

* * * * *